United States Patent
Hirohata et al.

(10) Patent No.: US 6,623,558 B2
(45) Date of Patent: Sep. 23, 2003

(54) CURABLE COMPOSITION FOR TENDON FOR PRESTRESSED CONCRETE AND TENDON

(75) Inventors: Toshiro Hirohata, Osaka (JP); Yasuji Ohgaki, Osaka (JP); Takashi Takagaki, Hyogo (JP); Takashi Yoshioka, Hyogo (JP); Kouji Kiyosu, Hyogo (JP); Yoshihiko Touda, Hyogo (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/873,396

(22) Filed: Jun. 5, 2001

(65) Prior Publication Data

US 2002/0011190 A1 Jan. 31, 2002

(30) Foreign Application Priority Data

Sep. 25, 2000 (JP) .................. 2000-290674
Jun. 5, 2000 (JP) .................. 2000-167991

(51) Int. Cl.$^7$ ............................ C04B 24/24
(52) U.S. Cl. .............. 106/724; 106/727; 106/823
(58) Field of Search ............. 106/724, 727, 106/823

(56) References Cited

U.S. PATENT DOCUMENTS

| | | | | | |
|---|---|---|---|---|---|
| 4,358,477 A | * | 11/1982 | Noomen et al. | ........... | 427/54.1 |
| 4,829,104 A | * | 5/1989 | McIntyre et al. | ........... | 523/403 |
| 4,883,572 A | * | 11/1989 | Rao et al. | ........... | 524/901 |
| 4,929,650 A | * | 5/1990 | Kurauchi et al. | ........... | 523/455 |
| 5,312,879 A | * | 5/1994 | Rao et al. | ........... | 525/526 |
| 5,336,702 A | * | 8/1994 | Kamikado | ........... | 523/417 |
| 5,554,672 A | * | 9/1996 | Saito et al. | ........... | 523/466 |
| 5,591,814 A | * | 1/1997 | Murio et al. | ........... | 525/528 |
| 5,889,124 A | * | 3/1999 | Ando et al. | ........... | 525/403 |
| 6,037,435 A | * | 3/2000 | Hayashi et al. | ........... | 528/103 |
| 6,063,893 A | * | 5/2000 | Karasawa et al. | ........... | 528/93 |

FOREIGN PATENT DOCUMENTS

| | | |
|---|---|---|
| DE | 10026148 A1 | 12/2000 |
| EP | 0273564 | 7/1998 |
| EP | 1048682 A2 | 11/2000 |
| JP | 55-500274 | 5/1980 |
| JP | 58-70864 | 4/1983 |
| JP | 2-36220 | 2/1990 |
| JP | 2-45518 | 2/1990 |
| JP | 5-69939 | 10/1993 |
| JP | 8-11791 | 2/1996 |
| JP | 11-349912 | 12/1999 |
| JP | 2000-34457 | 2/2000 |
| JP | 2000-281967 | 10/2000 |

OTHER PUBLICATIONS

"Testing Methods for Durometer Hardness of Plastics", (K7215–1986), pp. 409–413.

* cited by examiner

Primary Examiner—Paul Marcantoni
(74) Attorney, Agent, or Firm—McDermott, Will & Emery

(57) ABSTRACT

A curable composition applied to the surface of a tendon for prestressed concrete contains at least an epoxy resin and a moisture-curing type curing agent. In the curable composition, the tensioning-permitting time L at 90° C. is at least 20 hours, and the number of days M required to cure at normal temperature is at most 1095 days. The curable composition for tendons for prestressed concrete according to the present invention permits complete prevention of corrosion without conducting injection of a grout into a sheath and can be used even when the curable composition is heated to a high temperature by heat generated upon hardening of concrete.

15 Claims, 2 Drawing Sheets

Parts x (phr) of Epicure H3 incorporated (Formulation)
Epikote 828/Epicure H3/Aerosil RY200S
= 100/x/3

Parts x (phr) of Epicure H3 incorporated (Formulation)
Epikote 828/Epicure H3/Aerosil RY200S
= 100/x/3

US 6,623,558 B2

CURABLE COMPOSITION FOR TENDON FOR PRESTRESSED CONCRETE AND TENDON

FIELD OF THE INVENTION

The present invention relates to a curable composition for tendons for prestressed concrete, and more particularly to a curable composition which is applied to the surface of a tendon used in a post-tensioning system for prestressed concrete for the purpose of preventing the tendon from being corroded or rusted and obtaining good bond characteristic between the tendon and concrete. The present invention also relates to a sheath-covered tendon for prestressed concrete, which is not required to inject a grout into a sheath in a post-tensioning system for prestressed concrete, is bonded with concrete after tensioning the tendon and is completely prevented from being corroded.

BACKGROUND OF THE INVENTION

A prestressed concrete technique is a technique that steel such as a piano wire is arranged for applying compression force in advance to a place, on which a tensile load acts, and is tensioned when the strength of concrete reaches a certain level. The prestressed concrete technique includes a post-tensioning system and a pretensioning system.

In the conventional post-tensioning system, a metal-made sheath is buried in concrete before concrete placing, a tendon such as prestressing steel (steel wire for PC, steel strand for PC, steel bar for PC or the like) is inserted into this sheath, and the tendon is tensioned after hardening the concrete. Lastly, a grout such as a cement milk is injected between the sheath and the tendon for preventing the tendon from being corroded and obtaining good bond characteristic between the tendon and the concrete. In this system, however, the injecting work of the grout such as the cement milk is complicated and forms the main cause of increase in cost. In addition, this system has involved such problems that the injection is liable to become incomplete, and so the tendon may gather rust.

In order to solve such defects, therefore, for example, Japanese Patent Publication No. 69939/1993 has proposed a tendon for prestressed concrete, to the surface of which a resin, with which a curing agent has been mixed at a mixing ratio according to the prescribed curing time so as not to cure before the tendon is tensioned and so as to cure at normal temperature after the tendon is tensioned, to initiate curing, has been applied. In Examples of this publication, curable compositions with a tertiary amine curing agent containing a curing accelerator added to an epoxy resin are disclosed.

Japanese Patent Publication No. 11791/1996 has proposed that a curable composition comprising an epoxy resin as a main component and a latent curing agent that undergoes chemical curing at normal temperature, such as dicyandiamide, is provided as a coating material for tendons for prestressed concrete.

According to the method making use of these curable compositions, the tendon can be completely prevented from being corroded without conducting grouting. More specifically, in this method, the epoxy resin (curable composition), in which the kind and amount of the curing agent have been adjusted so as not to cure before the tendon is tensioned and so as to cure at normal temperature after the tendon is tensioned, is applied to the tendon, and the tendon is tensioned after the concrete has hardened and before the epoxy resin cures. At this time, the tensioning is feasible because the epoxy resin is liquid. After the tensioning, the epoxy resin gradually cures at normal temperature to finally bond the tendon with the concrete and completely prevent it from being corroded. After applying the epoxy resin to the tendon, the coated surface may be covered with a resin sheath as needed. In this case, the tendon is bonded with the concrete through the resin sheath.

However, the conventional curable compositions have involved the following problems. Concrete generally generates heat upon curing after the concrete is placed. Therefore, the concrete structure may be heated to a high temperature near 100° C. in some cases according to the size and shape thereof. The conventional curable compositions are stable at room temperature for a long period of time, but quickly undergo a reaction at a high temperature near 100° C. It is extremely difficult to control the formulation of a curable composition containing an epoxy resin so as not to cure at a high temperature near 100° C. and so as to retain the curability at normal temperature.

When the curable composition applied to the tendon is prematurely cured by the heat generated upon the hardening of the concrete, the tendon can not be tensioned after the concrete has been hardened. On the other hand, when the amounts of the curing agent and curing accelerator are lessened, the premature curing of the curable composition at the high temperature can be prevented. However, the curing period at normal temperature extremely lengthens. Accordingly, the technique by the post-tensioning system for prestressed concrete using the conventional curable compositions has involved a problem that applicable places and objects are limited.

OBJECTS AND SUMMARY OF THE INVENTION

It is an object of the present invention to provide a curable composition for tendons for prestressed concrete, which can completely prevent the tendons from being corroded without conducting injection of a grout into a sheath and used even when it is heated to a high temperature by heat generated upon hardening of concrete.

Another object of the present invention is to provide a sheath-covered tendon for prestressed concrete, which is not required to inject a grout into a sheath in a post-tensioning system for prestressed concrete, is bonded with concrete after tensioning the tendon and is completely prevented from being corroded.

The present inventors have carried out an extensive investigation with a view toward achieving the above-described objects. As a result, it has been found that a curable composition containing at least an epoxy resin and a moisture-curing type curing agent, wherein the tensioning-permitting time at 90° C. and the number of days required to cure at normal temperature of the curable composition satisfy the respective specified relationships, is suitable for tendons for prestressed concrete.

When said curable composition is applied to the surface of a tendon, and the tendon is used in a technique for prestressed concrete according to a post-tensioning system, the curable composition does not prematurely cure even when it is heated to a high temperature by heat generated upon hardening of concrete, and so the tensioning of the tendon is feasible. In addition, the curable composition undergoes a curing reaction at normal temperature thereafter, whereby the tendon can be bonded with the concrete directly or through a sheath. The present invention has been led to completion on the basis of these findings.

According to the present invention, there is provided a curable composition for tendons for prestressed concrete, which is applied to the surface of a tendon for prestressed concrete, said curable composition comprising at least an epoxy resin and a moisture-curing type curing agent, wherein the tensioning-permitting time L at 90° C., which is expressed by the time required until the viscosity of the curable composition as measured at 25° C. at the time when the curable composition has been left to stand under environment of 90° C. and 60% in relative humidity reaches 10,000 poises, and the number of days M required to cure at normal temperature, which is expressed by days required until the type D Durometer hardness of the curable composition as measured in accordance with JIS K 7215 at the time when the curable composition has been left to stand at 25° C. reaches 60, satisfy the respective relationships represented by the following expressions (1) and (2):

$$L \text{ (hours)} \geq 20 \quad (1)$$

$$M \text{ (days)} \leq 1095 \quad (2).$$

According to the present invention, there is also provided a sheath-covered tendon for prestressed concrete having a

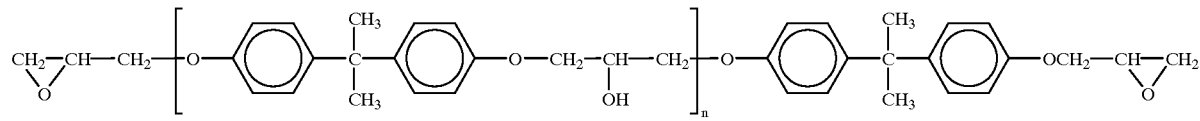

structure that a curable composition is applied to the surface of a tendon for prestressed concrete, and the coated surface thereof is covered with a sheath, wherein the curable composition comprises at least an epoxy resin and a moisture-curing type curing agent, wherein the tensioning-permitting time L at 90° C., which is expressed by the time required until the viscosity of the curable composition as measured at 25° C. at the time when the curable composition has been left to stand under environment of 90° C. and 60% in relative humidity reaches 10,000 poises, and the number of days M required to cure at normal temperature, which is expressed by days required until the type D Durometer hardness of the curable composition as measured in accordance with JIS K 7215 at the time when the curable composition has been left to stand at 25° C. reaches 60, satisfy the respective relationships represented by the following expressions (1) and (2):

$$L \text{ (hours)} \geq 20 \quad (1)$$

$$M \text{ (days)} \leq 1095 \quad (2).$$

DETAILED DESCRIPTION OF THE INVENTION

Figure 1:
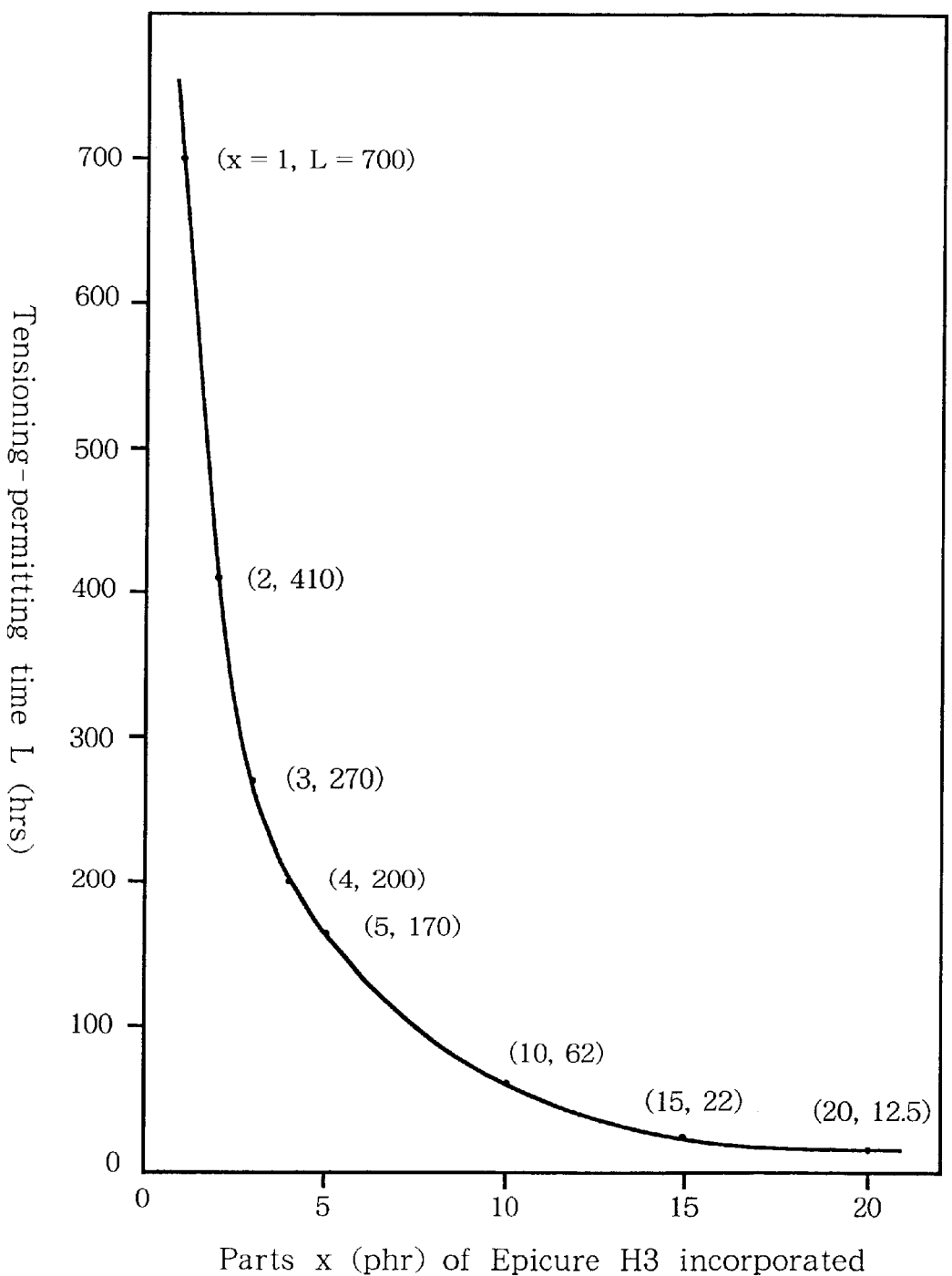
FIG. 1 diagrammatically illustrate the relationship between the number of parts x (phr) of a moisture-curing type curing agent incorporated into 100 parts by weight of an epoxy resin and tensioning-permitting time L.

A main component of the curable composition according to the present invention is an epoxy resin. No particular limitation is imposed on the epoxy resin, and examples thereof include bisphenol A diglycidyl ether, bisphenol F diglycidyl ether, novolak glycidyl ether and tetraglycidyl-diaminodiphenylmethane. These epoxy resins may be used either singly or in any combination thereof. The epoxy resin is preferably a liquid epoxy resin having a viscosity of at most 1,000 poises as measured at 25° C.

Among these epoxy resins, are preferred bisphenol A diglycidyl ether of a low cost, i.e., a bisphenol A type epoxy resin represented by the following formula:

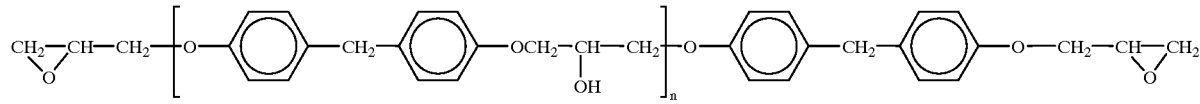

and bisphenol F diglycidyl ether having a low viscosity to facilitate tensioning, i.e., a bisphenol F type epoxy resin represented by the following formula:

In these formulae, n represents a degree of polymerization. In general, a liquid epoxy resin having a degree of polymerization (n) of 0 or about 0.1 is preferably used. These epoxy resins may be used either singly or in any combination thereof.

The moisture-curing type curing agent used in the present invention means a curing agent having a function that it reacts with moisture present in the air to form a curing agent as a reaction product, thereby initiating a curing reaction of the epoxy resin. Compounds having such a function include ketimine compounds. The ketimine compounds may be preferably used in the present invention. Ketimine refers to a compound having a structure that the oxygen of a carbonyl group in ketone has been substituted by an imino group.

A ketimine compound used in the present invention is an amine compound having at least one primary amino group blocked by a carbonyl compound in its molecule. The primary amino group blocked by the carbonyl compound is a protected amino group easily hydrolyzed in the presence of, for example, water to be converted into a free primary amino group and can be typically represented by the following formula:

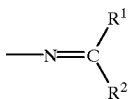

wherein $R^1$ and $R^2$ individually represent a hydrogen atom or a hydrocarbon group such as an alkyl, cyclohexyl or aryl group.

The amine compound may be any of aliphatic, alicyclic and aromatic amine compounds. Specific examples of the amine compound include aliphatic polyamines such as monoethylamine, ethylenediamine, propylenediamine, alkoxypropylamine and allylamine; aromatic polyamines such as diaminodiphenylmethane and diaminodiphenyl ether; alicyclic polyamines such as diaminocyclohexane; and polyamides having at least one primary amino group at their molecular chain terminals.

Carbonyl compounds used for converting the amine compound into the ketimine include ketones and aldehydes, and specific examples thereof include ketones such as acetone, methyl ethyl ketone, methyl propyl ketone, methyl isobutyl ketone, cyclohexanone, acetophenone and benzophenone; and aldehydes such as acetoaldehyde and benzaldehyde.

The ketimine compound used in the present invention can be obtained by a dehydration-condensation reaction of the amine compound with the carbonyl compound. This dehydration-condensation reaction can be conducted under the same conditions as in an ordinary dehydration-condensation reaction of an amine with an aldehyde or ketone. More specifically, the dehydration-condensation reaction is conducted by, for example, mixing the amine compound with the ketone or aldehyde in an amount not less than the theoretical reaction weight of the amine compound, and causing the reactants to react with each other while removing water formed by the reaction.

The curable composition according to the present invention satisfies the respective expressions (1) and (2) as to the tensioning-permitting time L at 90° C. and the number of days M required to cure at normal temperature. Such properties can be substantially achieved by controlling the proportion of the moisture-curing type curing agent incorporated. The above-described properties can also be achieved by incorporating a latent curing agent, a curing accelerator or the like as a curing auxiliary in addition to the moisture-curing type curing agent into the curable composition.

No particular limitation is imposed on the latent curing agent used in the present invention. However, examples thereof include dicyandiamides such as dicyandiamide and derivatives thereof, dihydrazides such as adipic acid dihydrazide, amine adducts, diaminomaleonitriles such as diaminomaleonitrile and derivatives thereof, and microcapsules obtained by wrapping a curing agent (for example, an aliphatic amine, alicyclic amine or aromatic amine) into a film.

No particular limitation is imposed on the curing accelerator used in the present invention. However, examples thereof include tertiary amine compounds such as 2,4,6-tris (diaminomethyl)phenol (abbreviated as "DMP-30") and benzyldimethylamine (abbreviated as "BDMA"), imidazole compounds, and $BF_3$ complexes.

Into the curable composition according to the present invention, may be incorporated a diluent, a filler, a thickener, etc. in addition to the above components as needed. The diluent is incorporated for adjusting the viscosity of the curable composition. When the viscosity of the curable composition is lowered by the addition of the diluent, the tensioning can be conducted with ease. As the diluent, may be used, for example, a reactive diluent such as n-butyl glycidyl ether, benzyl alcohol, phthalic ester, or the like. The filler is incorporated for reducing the cost and controlling thixotropic property, and examples thereof include calcium carbonate, talc and silica. The thickener is incorporated for increasing the viscosity of the curable composition or preventing precipitation or aggregation of powder such as the dicyandiamide, and examples thereof include finely particulate silica such as commercially available Aerosil. The additive components such as the diluent, filler and thickener may be used in respective proper amounts according to the purposes. For example, the thickener such as finely particulate silica is used in an incorporating proportion of preferably 0.1 to 15 parts by weight, more preferably 0.5 to 10 parts by weight, particularly preferably 1 to 5 parts by weight per 100 parts by weight of the epoxy resin.

When no sheath is used, or the quantity of heat generated upon hardening of concrete is great even when a sheath is used, water contained in unhardened concrete may penetrate directly or through the sheath into the curable composition in some cases. In work at a rainy season or in a rainy zone, the curable composition may absorb a great amount of moisture. In such a case, a curing reaction is accelerated by water penetrated, and so there is a possibility that the desired curing characteristics may not be achieved. As a countermeasure thereof, there is a method in which a dehydrating agent is incorporated in advance to absorb excess water in the dehydrating agent, thereby preventing the curing reaction from being accelerated.

Examples of the dehydrating agent include calcium oxide, water-absorbing polymers, molecular sieves, silane coupling agents and mixtures thereof. Among these, calcium oxide is particularly preferred from the viewpoints of cost and water absorption property. No particular limitation is imposed on the proportion of the dehydrating agent incorporated. When the dehydrating agent is incorporated, the proportion is preferably 0.1 to 200 parts by weight, more preferably 0.3 to 100 parts by weight per 100 parts by weight of the epoxy resin. In many cases, good results can be yielded when the incorporating proportion is at most 50 parts by weight. If the incorporating proportion of the dehydrating agent is too low, the dehydrating effect may not be sufficiently achieved in some cases. If the proportion is too high, the viscosity of the resulting curable composition becomes too high to incur a possibility that tensioning may become difficult.

In the construction making use of the sheath, the above-described problem can also be improved by using a resin low in water permeability as a material for forming the sheath. No particular limitation is imposed on the resin low in water permeability, and examples thereof include vinyl chloride resins, ethylene-vinyl alcohol copolymers and polyamide resins.

Contrary to the above, when moisture may possibly be lacking upon use of the curable composition in a dry zone, a hydrate is incorporated in advance to heat the curable composition to 80 to 150° C. before execution, whereby water can be released from the hydrate to prevent the lack of curing. Examples of such a hydrate include aluminum sulfate hydrates and calcium sulfate hydrates. These hydrates is used in an incorporating proportion necessary to supply the moisture if desired.

When a ketimine compound is used as the moisture-curing type curing agent, the curing speed of the curable composition can be accelerated by adding an alcohol, a phenol or a mixture thereof. The curing speed-improving effect by the alcohol and/or the phenol is greater at normal temperature than at a high temperature. Therefore, when curable compositions are prepared in such a manner that the tensioning-permitting time is equal to each other, the number of days required to cure in the curable composition containing the alcohol and/or the phenol is shorter compared with the curable composition containing no these compounds.

No particular limitation is imposed on the alcohol and/or the phenol, and examples thereof include alcohols such as methanol, ethanol, isopropyl alcohol and cyclohexanol; and phenols such as benzyl alcohol, phenol, cresol and resorcinol. Among these, benzyl alcohol is particularly preferred in that it does not solidify at a low temperature and is hard to volatilize during its storage. No particular limitation is imposed on the incorporating proportion of the alcohol and/or the phenol. However, it is generally about 0.1 to 30 parts by weight per 100 parts by weight of the epoxy resin. If the incorporating proportion of the alcohol and/or the phenol is too low, the improving effect on curing characteristics may not be sufficiently achieved in some cases. If the proportion is too high, the viscosity of the resulting curable composition is lowered to a great extent, and so such a composition may sag in some cases when it is applied to a tendon such as prestressing steel.

An epoxy resin, to which a latent curing agent such as dicyandiamide disclosed in Japanese Patent Publication No. 11791/1996, and a curing accelerator are added, can be adjusted so as not to cure before a tendon is tensioned, since it is stable at room temperature for a long period of time. However, such a resin quickly undergoes a curing reaction at a high temperature near 100° C. like the ordinary curing agents. When the amounts of the curing agent and curing accelerator added are lessened, the reaction at the high temperature can be slowed. However, curing at normal temperature becomes extremely slow, and it takes a long period of time to bond a tendon with concrete.

On the other hand, the curable composition according to the present invention can cure within 3 years (1095 days), often several months to 3 years at normal temperature by using the moisture-curing type curing agent that initiates curing by moisture, and moreover can retain an uncured state for a necessary period of time without quickly undergoing a reaction even at a high temperature near 100° C. The moisture-curing type curing agent is generally used in paints or coatings. The epoxy resin containing the moisture-curing type curing agent is known to cure in several hours to several days at normal temperature when it is thinly coated and exposed to the air.

On the other hand, the present inventors have found that excellent curing characteristics suitable for the present use, which cannot be achieved by the conventional curable composition disclosed in Japanese Patent Publication No. 11791/1996, can be brought about by using the moisture-curing type curing agent and controlling the curing characteristics by the incorporating proportion thereof, its combination with the dehydrating agent, and the like. The curing characteristics are entirely different from those brought about by the formulation of the conventional epoxy resin/moisture-curing type curing agent used in paints and the like. It is particularly preferred to use the curable composition according to the present invention in a closed system between the tendon such as prestressing steel and the resin sheath from the viewpoint of effectively exhibiting the various effects thereof.

The chemical equivalent of the curing reaction and reactivity vary according to the kind of the epoxy resin and the kind of the moisture-curing type curing agent such as a ketimine compound. Accordingly, the preferable amounts of the epoxy resin and the moisture-curing type curing agent incorporated vary according to the kinds thereof. However, the following characteristics can be brought about by controlling the kinds and incorporating proportions of the epoxy resin and the moisture-curing type curing agent, whereby the curable composition having the excellent curing characteristics suitable for the uses of the present invention can be provided.

More specifically, in the curable composition according to the present invention, the tensioning-permitting time L at 90° C. and the number of days M required to cure at normal temperature satisfy the respective relationships represented by the following expressions (1) and (2):

$$L \text{ (hours)} \geq 20 \qquad (1)$$

$$M \text{ (days)} \leq 1095 \qquad (2).$$

The tensioning-permitting time L at 90° C. means the time required until the viscosity of the curable composition as measured at 25° C. at the time when the curable composition has been left to stand under environment of 90° C. and 60% in relative humidity reaches 10,000 poises (ps). More specifically, the viscosity of the curable composition can be obtained by leaving the curable composition to stand under environment of 90° C. and 60% in relative humidity for the prescribed period of time in a state that the curable composition has been filled between a tendon and a sheath and then taking the curable composition out of the sheath to measure a viscosity thereof.

The number of days M required to cure at normal temperature means days required until the type D Durometer hardness of the curable composition as measured in accordance with JIS K 7215 at the time when the curable composition has been left to stand at 25° C. reaches 60. More specifically, the number of days M required to cure can be obtained by leaving the curable composition to stand in a room controlled at 25° C. (relative humidity: about 50%) for the prescribed days in a state that the curable composition has been filled between a tendon and a sheath and then measuring the hardness of the curable composition. The hardness is measured in accordance with JIS K 7215. The curable composition was regarded as cured when the type D Durometer hardness (hereinafter may be referred to merely as "Durometer D hardness") of the curable composition is 60 or higher.

The control of the tensioning-permitting time L and the number of days M required to cure can also be conducted by using the moisture-curing type curing agent and the latent curing agent and/or the curing accelerator in combination.

The tensioning-permitting time L is preferably at least 20 hours (L≧20), more preferably at least 50 hours (L≧50), still more preferably at least 100 hours (L≧100). The number of days M required to cure is preferably at most 1095 days (M≦1095; 3 years or shorter), more preferably at most 912 days (M≦912; 2.5 years or shorter), still more preferably at most 730 days (M≦730; 2 years or shorter).

If the tensioning-permitting time L is shorter than 20 hours, the curing reaction at a high temperature is accelerated like the conventional formulation using dicyandiamide or the like, and tensioning cannot be conducted after hardening concrete according to the size or shape of a concrete structure. In use for tendons for prestressed concrete, application actually becomes difficult when it takes a too long period of time to exhibit performance after execution. Therefore, it is desirable that the curable composition cures within 2 years at normal temperature, and the curable composition must cure within 3 years at the longest. Accordingly, any curable composition that the number of days M required to cure exceeds 1095 days is unsuitable for application to the present use.

A method for controlling the above-described L and M values will be described taking the case of, for example, a curable composition containing 100 parts by weight of a bisphenol A type epoxy resin "Epikote 828" (product of Yuka Shell Epoxy Kabushikikaisha), 3 parts by weight of a moisture-curing type curing agent "Epicure H3" (product of Yuka Shell Epoxy Kabushikikaisha) and 3 parts by weight of a thickener "Aerosil RY200S" (product of Nippon Aerosil Co., Ltd.). The relationship between the L value or M value and the incorporating proportion (phr) of the moisture-curing type curing agent "Epicure H3" is as illustrated in FIGS. 1 and 2.

Figure 2:
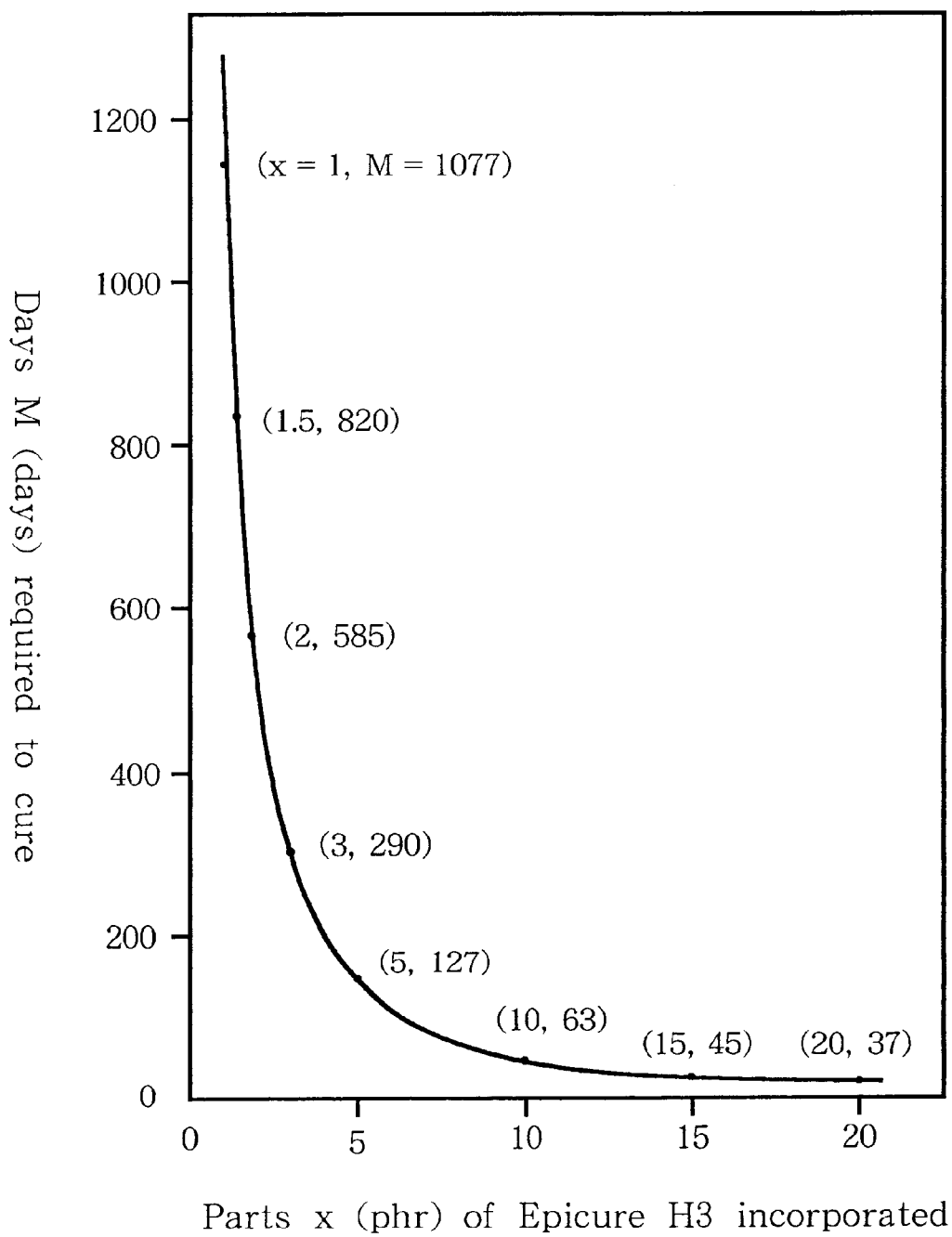
FIG. 2 diagrammatically illustrate the relationship between the number of parts x (phr) of a moisture-curing type curing agent incorporated into 100 parts by weight of an epoxy resin and the number of days M required to cure at normal temperature.

It is understood from the experimental data shown in FIGS. 1 and 2 that the incorporation proportion of the moisture-curing type curing agent to 100 parts by weight of the epoxy resin is desirably controlled to preferably 1 to 16.5 parts by weight (phr), more preferably 1.25 to 11.2 parts by weight, particularly preferably 1.5 to 7.2 parts by weight. In the case where the alcohol and/or the phenol is added to the above-described curable composition, the incorporating proportion of the moisture-curing type curing agent to 100 parts by weight of the epoxy resin can be reduced to preferably 0.3 to 13 parts by weight (phr), more preferably 1 to 10 parts by weight.

The number of equivalent parts of the moisture-curing type curing agent incorporated in the above formulation is 54 parts by weight (phr) per 100 parts by weight of the epoxy resin. Therefore, it is understood that the number of parts of the moisture-curing type curing agent incorporated in the present invention is controlled within a specified range less than the number of equivalent parts incorporated, whereby excellent curing characteristics suitable for the use of the present invention can be obtained. Even when the epoxy resin and the moisture-curing type curing agent are used in other proportions than the above formulation, the same curing characteristics as described above can be obtained so far as the equivalent number thereof is controlled within a range corresponding to the above limited range of the number of parts incorporated.

The range of the equivalent number corresponding to the proportion of the moisture-curing type curing agent incorporated is preferably $0.019 \leq P \leq 0.31$, more preferably $0.023 \leq P \leq 0.21$, particularly preferably $0.028 \leq P \leq 0.13$ in terms of a ratio (P) of the parts by weight of the moisture-curing type curing agent incorporated to the equivalent parts by weight incorporated. When the alcohol and/or the phenol is added, such a range is preferably $0.0056 \leq P \leq 0.24$, more preferably $0.023 \leq P \leq 0.19$.

The control of the tensioning-permitting time and the number of days required to cure can also be conducted by using the moisture-curing type curing agent and the latent curing agent and/or the curing accelerator in combination. It is effective that the incorporating amount of the latent curing agent used in the present invention is controlled to generally at most 10 g, preferably at most 6 g to the weight of the epoxy resin containing 1 g equivalent weight of an epoxy group. If the amount of the latent curing agent incorporated is too great, the curing reaction becomes too fast, and so the tendon may not be tensioned after hardening concrete in some cases. It is effective that the incorporating amount of the curing accelerator used in the present invention is controlled to generally at most 1 g, preferably at most 0.5 g to the weight of the epoxy resin containing 1 g equivalent weight of an epoxy group. If the amount of the curing accelerator incorporated is too great, the curing reaction becomes too fast, and so the tendon may not be tensioned after hardening concrete in some cases. The weight of the epoxy resin containing 1 g equivalent weight of an epoxy group means 189 g in the case of, for example, an epoxy resin the epoxy equivalent of which is 189 g/eq.

In the present invention, no particular limitation is imposed on the coating thickness and form of the curable composition applied to a tendon. However, when a film thickness is very thin, the amount of moisture absorbed upon the application per unit quantity of the curable composition becomes greater when production is conducted by, for example, a system that the curable composition is applied to the tendon, and the coated surface thereof is then covered with a sheath, and so the curing speed of the curable composition may become too high in some cases. Therefore, it is effective that the average thickness of the coating layer is controlled to preferably at least 0.1 mm, more preferably at least 0.3 mm. The upper limit of the average thickness of the coating layer can be suitably determined according to the shape and size of the tendon, desired curing characteristics, etc. However, good results can be yielded when the upper limit is generally at most 5 mm, preferably at most 3 mm.

In the present invention, prestressing steel (steel wire for PC, steel strand for PC, steel bar for PC or the like) or the like may be used as a tendon. The prestressing steel is steel well known in this technical field. For example, the steel wire for PC means "an uncoated stress-relieved steel wire for prestressed concrete". The steel strand for PC means "an uncoated stress-relieved steel strand for prestressed concrete". The steel bar for PC means "a steel bar for prestressed concrete".

In the present invention, the tendon is preferably equipped with a sheath. More specifically, a sheath-covered tendon for prestressed concrete of a structure that the curable composition is applied to the surface of a tendon for prestressed concrete, and the coated surface thereof is covered with a sheath is preferred. In the present invention, the sheath may be formed with, for example, a synthetic resin such as polyethylene, or a metal such as normal steel. When the sheath is formed with a synthetic resin, the curable composition is applied to the surface of the tendon, and the synthetic resin is then extruded on the coated surface thereof, whereby the sheath can be formed.

No particular limitation is imposed on the form of the sheath. However, examples thereof include a pipe-like sheath and a sheath on the outside of which indented portions and projected portions in a corrugated or spiral shape have been formed. The stability to curing of the curable composition can be enhanced by covering the coated surface of the tendon by the curable composition with the sheath to close it. The sheath-covered tendon for prestressed concrete according to the present invention is in a form that the curable composition has been filled between the tendon and the sheath.

EMBODIMENTS OF THE INVENTION

The present invention will hereinafter be described more specifically by the following Examples and Comparative Examples. Various properties or characteristics were determined in accordance with the following respective methods.
(1) Tensioning-Permitting Time L at 90° C.:

After a tendon coated with a test curable composition and covered with a sheath was left to stand for the prescribed period of time under environment of 90° C. and 60% in relative humidity, the sheath was peeled to sample the curable composition, thereby measuring the viscosity of the curable composition at 25° C. by means of a viscoelasticity analyzer MR-300 manufactured by K. K. Rheologe. Parallel plates were used to conduct measurement under conditions of a gap of 0.33 mm, a frequency of 5 Hz and a strain of 10. The time required until the viscosity of the curable composition at 25° C. reached 10,000 poises was determined from the resultant values.

(2) Tensioning-Permitting Time L' at 90° C. Under Steam:

In consideration of the fact that a sheath-covered tendon is exposed to water in unhardened concrete in an actually used state, tensioning-permitting time was determined under environmental conditions of 90° C. under steam in the same manner as in the above item (1), and this time was regarded as tensioning-permitting time L'.

(3) The Number of Days M Required to Cure at Normal Temperature:

The confirmation of cure was conducted by peeling a sheath of a sheath-covered tendon sample stored for the prescribed period of time at 25° C. to measure the hardness of the curable composition. The hardness was measured in accordance with JIS K 7215, and the curable composition was regarded as cured when the type D Durometer hardness of the curable composition was 60 or higher.

(4) Overall Judgment:

The tensioning-permitting time L at 90° C., tensioning-permitting time L' at 90° C. under steam and the number of days M required to cure at normal temperature were synthetically taken into consideration to evaluate each curable composition sample as to the properties or characteristics by the following 4 ranks:

◎: Particularly excellent;
○: Excellent;
△: Good; and
✕: Defective.

EXAMPLE 1

Individual components in a formulation shown in Table 1 making use of a ketimine type curing agent, Epicure H3 (product of Yuka Shell Epoxy Kabushikikaisha) as a moisture-curing type curing agent were stirred and mixed to obtain a curable composition. The resultant curable composition was applied to steel strand for PC. On the coated surface thereof, a polyethylene sheath was formed by extrusion making use of high-density polyethylene "Hizex" (product of Mitsui Kagaku Co., Ltd.). Further, a number of indented portions and projected portions were formed on the sheath by a surface treatment. The thicknesses of the curable composition at each projected portion and indented portion were 1 to 3 mm and 0.3 to 0.5 mm, respectively.

With respect to the sheath-covered tendon thus obtained, the tensioning-permitting time L at 90° C., tensioning-permitting time L' at 90° C. under steam and the number of days M required to cure at normal temperature were determined. As a result, it was confirmed that a curable composition, which was relatively long in the tensioning-permitting time at 90° C., and cured within a year at normal temperature, and a sheath-covered tendon using such a composition were obtained. The results are shown in Table 1.

EXAMPLE 2

A curable composition and a sheath-covered tendon were produced in the same manner as in Example 1 except that the formulation of the curable composition was changed to that shown in Table 1, to evaluate them. As a result, it was confirmed that a curable composition, which was long in the tensioning-permitting time at 90° C., and cured within a year at normal temperature, and a sheath-covered tendon using such a composition were obtained.

EXAMPLE 3

A curable composition and a sheath-covered tendon were produced in the same manner as in Example 1 except that the formulation of the curable composition was changed to that shown in Table 1, to evaluate them. As a result, it was confirmed that a curable composition, which was considerably long in the tensioning-permitting time at 90° C., and cured within a year at normal temperature, and a sheath-covered tendon using such a composition were obtained.

EXAMPLE 4

A curable composition and a sheath-covered tendon were produced in the same manner as in Example 1 except that the formulation of the curable composition was changed to that shown in Table 1, to evaluate them. As a result, it was confirmed that a curable composition, which was considerably long in the tensioning-permitting time at 90° C., and cured within a year at normal temperature, and a sheath-covered tendon using such a composition were obtained.

EXAMPLE 5

A curable composition and a sheath-covered tendon were produced in the same manner as in Example 1 except that the formulation of the curable composition was changed to that shown in Table 1, to evaluate them. As a result, it was confirmed that a curable composition, which was considerably long in the tensioning-permitting time at 90° C., and cured within a year at normal temperature, and a sheath-covered tendon using such a composition were obtained.

EXAMPLE 6

A curable composition and a sheath-covered tendon were produced in the same manner as in Example 1 except that the formulation of the curable composition was changed to that shown in Table 1, to evaluate them. As a result, it was confirmed that a curable composition, which was extremely long in the tensioning-permitting time at 90° C., and cured within 2 years at normal temperature, and a sheath-covered tendon using such a composition were obtained.

EXAMPLE 7

A curable composition and a sheath-covered tendon were produced in the same manner as in Example 1 except that the formulation of the curable composition was changed to that shown in Table 1, to evaluate them. As a result, it was confirmed that a curable composition, which was extremely long in the tensioning-permitting time at 90° C., and cured within 2.5 years at normal temperature, and a sheath-covered tendon using such a composition were obtained.

EXAMPLE 8

A curable composition and a sheath-covered tendon were produced in the same manner as in Example 1 except that the formulation of the curable composition was changed to that shown in Table 1, to evaluate them. As a result, it was confirmed that a curable composition, which was extremely long in the tensioning-permitting time at 90° C., and cured within 3 years at normal temperature, and a sheath-covered tendon using such a composition were obtained.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Epikote 828 *1 | 100 | 100 | 100 | 100 | 100 | 100 | 100 | 100 |
| Epicure H3 *2 | 15 | 10 | 5 | 4 | 3 | 2 | 1.5 | 1 |
| HT2844 *3 | — | — | — | — | — | — | — | — |
| Dicyandiamide *4 | — | — | — | — | — | — | — | — |
| Epicure 3010 *5 | — | — | — | — | — | — | — | — |
| Aerosil RY200S *6 | 3 | 3 | 3 | 3 | 3 | 3 | 3 | 3 |
| Tensioning-permitting time L at 90° C. (hrs) | 22 | 62 | 170 | 200 | 270 | 410 | 520 | 700 |
| Tensioning-permitting time L at 90° C. under steam (hrs) | 8 | 21 | 53 | 71 | 86 | 141 | 177 | 230 |
| Days M required to cure (days) | 45 | 63 | 127 | 195 | 290 | 585 | 820 | 1077 |
| Overall judgment | Δ | Δ | ○ | ○ | ○ | ⊙ | ○ | Δ |

(Note)
*1 Bisphenol A type epoxy resin (product of Yuka Shell Epoxy Kabushikikaisha; n = 0.1, epoxy equivalent = 189 g/eq).
*2 Ketimine type moisture-curing type curing agent (product of Yuka Shell Epoxy Kabushikikaisha).
*3 Latent curing agent (product of Asahi-CIBA Limited).
*4 Latent curing agent (product of Nippon Carbide Industries Co., Ltd.).
*5 Curing accelerator (product of Yuka Shell Epoxy Kabushikikaisha).
*6 Thickener (product of Nippon Aerosil Co., Ltd.).

EXAMPLE 9

A curable composition and a sheath-covered tendon were produced in the same manner as in Example 1 except that the formulation of the curable composition was changed to that shown in Table 2 using a moisture-curing type curing agent Epicure H3 and a curing accelerator Epicure 3010 in combination, to evaluate them. As a result, it was confirmed that a curable composition, which was long in the tensioning-permitting time at 90° C., and cured within a year at normal temperature, and a sheath-covered tendon using such a composition were obtained.

EXAMPLE 10

A curable composition and a sheath-covered tendon were produced in the same manner as in Example 1 except that the formulation of the curable composition was changed to that shown in Table 2 using a moisture-curing type curing agent Epicure H3 and a latent curing agent HT2844 in combination, to evaluate them. As a result, it was confirmed that a curable composition, which was relatively long in the tensioning-permitting time at 90° C., and cured within a year at normal temperature, and a sheath-covered tendon using such a composition were obtained.

EXAMPLE 11

A curable composition and a sheath-covered tendon were produced in the same manner as in Example 1 except that the formulation of the curable composition was changed to that shown in Table 2 using a moisture-curing type curing agent Epicure H3 and a curing accelerator Epicure 3010 in combination, to evaluate them. As a result, it was confirmed that a curable composition, which was considerably long in the tensioning-permitting time at 90° C., and cured within a year at normal temperature, and a sheath-covered tendon using such a composition were obtained.

EXAMPLE 12

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C., was not reduced in the tensioning-permitting time even under steam and cured within a year at normal temperature, and a sheath-covered tendon using such a composition were obtained.

EXAMPLE 13

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C., was not reduced in the tensioning-permitting time even under steam and cured within a year at normal temperature, and a sheath-covered tendon using such a composition were obtained.

EXAMPLE 14

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C., was not reduced in the tensioning-permitting time even under steam and cured within a year at normal temperature, and a sheath-covered tendon using such a composition were obtained.

EXAMPLE 15

A curable composition and a sheath-covered tendon were produced in the same manner as in Example 1 except that the formulation of the curable composition was changed to that shown in Table 2, to evaluate them. As a result, it was confirmed that a curable composition, which was extremely long in the tensioning-permitting time at 90° C., was not reduced in the tensioning-permitting time even under steam and cured within 2 years at normal temperature, and a sheath-covered tendon using such a composition were obtained.

EXAMPLE 16

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C. and cured within a year at normal temperature, and a sheath-covered tendon using such a composition were obtained.

EXAMPLE 17

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C., was not reduced in the tensioning-permitting time even under steam and cured within a year at normal temperature, and a sheath-covered tendon using such a composition were obtained.

EXAMPLE 18

A curable composition and a sheath-covered tendon were produced in the same manner as in Example 1 except that the formulation of the curable composition was changed to that shown in Table 2, to evaluate them. As a result, it was confirmed that a curable composition, which was considerably long in the tensioning-permitting time at 90° C., was not reduced in the tensioning-permitting time even under steam and cured within a year at normal temperature, and a sheath-covered tendon using such a composition were obtained.

applied to places where heat will be generated to a great extent upon hardening of concrete, and a sheath-covered tendon using such a composition were obtained.

COMPARATIVE EXAMPLE 3

A curable composition and a sheath-covered tendon were produced in the same manner as in Example 1 except that the formulation of the curable composition was changed to that shown in Table 3, to evaluate them. As a result, it was confirmed that a curable composition, which required days exceeding 3 years to cure at normal temperature, and was difficult to actually apply from the viewpoints of a term of works and the like, and a sheath-covered tendon using such a composition were obtained.

COMPARATIVE EXAMPLE 4

A curable composition and a sheath-covered tendon were produced in the same manner as in Example 1 except that the formulation of the curable composition was changed to that shown in Table 3 using no moisture-curing type curing

TABLE 2

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Epikote 828 *1 | 100 | 100 | 100 | 100 | 100 | 100 | 100 | 100 | 100 | 100 |
| Epicure H3 *2 | 5 | 2 | 2 | 3 | 3 | 4 | 2 | 3 | 2 | 2 |
| HT2844 *3 | — | 2 (3.8*7) | — | — | — | — | — | — | — | — |
| Dicyandiamide *4 | — | — | — | — | — | — | — | — | — | — |
| Epicure 3010 *5 | 0.05 (0.095*7) | — | 0.05 (0.095*7) | — | — | — | — | — | — | — |
| Aerosil RY200S *6 | 3 | 3 | 3 | 3 | 3 | 3 | 3 | 3 | 3 | 3 |
| Calcium oxide | — | — | — | 5 | 30 | 5 | 5 | 0.3 | 5 | 5 |
| Benzyl alcohol | — | — | — | — | — | — | — | — | 7 | 3 |
| Tensioning-permitting time L at 90° C. (hrs) | 64 | 21 | 103 | 278 | 247 | 206 | 418 | 274 | 242 | 258 |
| Tensioning-permitting time L at 90° C. under steam (hrs) | 22 | 9 | 32 | 275 | 247 | 203 | 414 | 95 | 240 | 255 |
| Days M required to cure (days) | 75 | 183 | 225 | 295 | 310 | 202 | 588 | 290 | 182 | 352 |
| Overall judgment | Δ | Δ | ◯ | ⦿ | ⦿ | ⦿ | ⦿ | ◯ | ⦿ | ⦿ |

(Note)
*1 Epoxy resin (product of Yuka Shell Epoxy Kabushikikaisha).
*2 Ketimine type moisture-curing type curing agent (product of Yuka Shell Epoxy Kabushikikaisha).
*3 Latent curing agent (product of Asahi-CIBA Limited).
*4 Latent curing agent (product of Nippon Carbide Industries Co., Ltd.).
*5 Curing accelerator (product of Yuka Shell Epoxy Kabushikikaisha).
*6 Thickener (product of Nippon Aerosil Co., Ltd.)
*7 Amount added to Epikote 828 (189 g) containing 1 g equivalent weight of an epoxy group.

COMPARATIVE EXAMPLE 1

A curable composition and a sheath-covered tendon were produced in the same manner as in Example 1 except that the formulation of the curable composition was changed to that shown in Table 3, to evaluate them. As a result, it was confirmed that a curable composition, which was extremely short in the tensioning-permitting time at 90° C., and could not be applied to places where heat will be generated to a great extent upon hardening of concrete, and a sheath-covered tendon using such a composition were obtained.

COMPARATIVE EXAMPLE 2

A curable composition and a sheath-covered tendon were produced in the same manner as in Example 1 except that the formulation of the curable composition was changed to that shown in Table 2, to evaluate them. As a result, it was confirmed that a curable composition, which was short in the tensioning-permitting time at 90° C., and could not be agent, but using a latent curing agent, dicyandiamide, to evaluate them. As a result, it was confirmed that a curable composition, which was extremely short in the tensioning-permitting time at 90° C., and could not be applied to places where heat will be generated to a great extent upon hardening of concrete, and a sheath-covered tendon using such a composition were obtained.

TABLE 3

|  | Comp. Ex. 1 | Comp. Ex. 2 | Comp. Ex. 3 | Comp. Ex. 4 |
|---|---|---|---|---|
| Epikote 828 *1 | 100 | 100 | 100 | 100 |
| Epicure H3 *2 | 30 | 20 | 0.5 | — |
| HT2844 *3 | — | — | — | — |
| Dicyandiamide *4 | — | — | — | 8 |
| Epicure 3010 *5 | — | — | — | 0.1 |
| Aerosil RY200S *6 | 3 | 3 | 3 | 3 |

TABLE 3-continued

|  | Comp. Ex. 1 | Comp. Ex. 2 | Comp. Ex. 3 | Comp. Ex. 4 |
|---|---|---|---|---|
| Benzyl alcohol | — | — | — | 7 |
| Tensioning-permitting time L at 90° C. (hrs) | 7 | 12.5 | 1233 | 9 |
| Days M required to cure (days) | 22 | 37 | >1100 | 424 |
| Overall judgment | X | X | X | X |

(Note)
*[1] Epoxy resin (product of Yuka Shell Epoxy Kabushikikaisha).
*[2] Ketimine type moisture-curing type curing agent (product of Yuka Shell Epoxy Kabushikikaisha).
*[3] Latent curing agent (product of Asahi-CIBA Limited).
*[4] Latent curing agent (product of Nippon Carbide Industries Co., Ltd.).
*[5] Curing accelerator (product of Yuka Shell Epoxy Kabushikikaisha).
*[6] Thickener (product of Nippon Aerosil Co., Ltd.)

ADVANTAGES OF THE INVENTION

According to the present invention, curable compositions for tendons for prestressed concrete, which can completely prevent the tendons from being corroded without conducting injection of a grout into a sheath and used even when they are heated to a high temperature by heat generated upon hardening of concrete, can be provided. According to the present invention, sheath-covered tendons for prestressed concrete, which are not required to inject a grout into a sheath in a post-tensioning system for prestressed concrete, are bonded with concrete after tensioning the tendons and are completely prevented from being corroded, can also be provided.

According to the present invention, curable compositions which permit the compatibility of the slow curing reaction at high temperature with the curability at normal temperature, which has heretofore been impossible, are provided, thereby providing curable compositions for tendons for prestressed concrete and sheath-covered tendons, which are not required to inject a grout into a sheath, permit complete prevention of corrosion and can be used even when such a curable composition is heated to a high temperature by heat generated from concrete.

What is claimed is:

1. A sheath-covered tendon for prestressed concrete having a structure that a curable composition is applied to the surface of a tendon for prestressed concrete, and the coated surface thereof is covered with a sheath, wherein the curable composition comprises at least one liquid epoxy resin selected from the group consisting of bisphenol A epoxy resins and bisphenol F epoxy resins and a ketimine compound as a moisture-owing agent, wherein the range of the equivalent number corresponding to the proportion of the moisture-curing agent incorporated is $0.019 \leq P \leq 0.31$ in terms of a ratio P of the parts by weight of the moisture-curing agent incorporated to the equivalent parts by weight incorporated, and wherein the tensioning-permitting time L at 90° C., which is expressed by the time required until the viscosity of the curable composition as measured at 25° C. at the time when the curable composition has been left to stand under environment of 90° C. and 60% in relative humidity reaches 10,000 poises, and the number of days M required to cure at normal temperature, which is expressed by days required until the type D Durometer hardness of the curable composition as measured in accordance with JIS K 7215 at the time when the curable composition has been left to stand at 25° C. reaches 60, satisfy, the respective relationships represented by the following expressions (1) and (2):

$$L \text{ (hours)} \geq 20 \quad (1)$$

$$M \text{ (days)} \leq 1095 \quad (2).$$

2. The sheath-covered tendon according to claim 1, wherein the ketimine compound is a compound formed by a dehydration-condensation reaction of an amine compound with a carbonyl compound.

3. The sheath-covered tendon according to claim 1, wherein the curable composition comprises the moisture-curing agent in a proportion of 1 to 16.5 parts by weight per 100 parts by weight of the epoxy resin.

4. The sheath-covered tendon according to claim 1, wherein the curable composition further comprises an alcohol, a phenol or a mixture thereof.

5. The sheath-covered tendon according to claim 4, wherein the curable composition comprises the alcohol, the phenol or the mixture thereof in a proportion of 0.1 to 30 parts by weight of the epoxy resin.

6. The sheath-covered tendon according to claim 4, wherein the curable composition comprises the moisture-curing agent in a proportion of 0.3 to 13 parts by weight per 100 parts by weight of the epoxy resin.

7. The sheath-covered tendon according to claim 1, wherein the curable composition further comprises a dehydrating agent.

8. The sheath-covered tendon according to claim 7, wherein the dehydrating agent is calcium oxide, a water-absorbing polymer, a molecular sieve, a silane coupling agent or a mixture thereof.

9. The sheath-covered tendon according to claim 7, wherein the curable composition comprises the dehydrating agent in a proportion of 0.1 to 200 parts by weight per 100 parts by weight of the epoxy resin.

10. The sheath-covered tendon according to claim 1, wherein the curable composition further comprises at least one curing auxiliary selected from the group consisting of curing accelerators and latent curing agents.

11. The sheath-covered tendon according to claim 10, wherein the curing accelerator is a tertiary amine compound, an imidazole compound, a $BF_3$ complex or a mixture thereof.

12. The sheath-covered tendon according to claim 10 wherein the latent curing agent is a dicyandiamide, a dihydrazide, an amine adduct, a diaminomaleonitrile or a mixture thereof.

13. The sheath-covered tendon according to claim 10, wherein the curable composition comprises the latent curing agent in a proportion of at most 10 g to the weight of the epoxy resin containing 1 g equivalent weight of an epoxy group.

14. The sheath-covered tendon according to claim 10, wherein the curable composition comprises the curing accelerator in a proportion of at most 1 to the weight of the epoxy resin containing 1 g equivalent weight of an epoxy group.

15. The sheath-covered tendon according to claim 11, wherein the curable composition further comprises a thickener.

* * * * *

UNITED STATES PATENT AND TRADEMARK OFFICE
CERTIFICATE OF CORRECTION

PATENT NO. : 6,623,558 B2  
APPLICATION NO. : 09/873396  
DATED : September 23, 2003  
INVENTOR(S) : Toshiro Hirohata et al.

Page 1 of 1

It is certified that error appears in the above-identified patent and that said Letters Patent is hereby corrected as shown below:

In the Claims:

Column 17, line 51, "moisture-owing" should read -- moisture-curing --

Column 18, line 61, "claim 11" should read -- claim 1 --

Signed and Sealed this  
Twenty-fourth Day of September, 2013

Teresa Stanek Rea  
*Deputy Director of the United States Patent and Trademark Office*